(12) United States Patent
Gill et al.

(10) Patent No.: US 9,817,765 B2
(45) Date of Patent: *Nov. 14, 2017

(54) DYNAMIC HIERARCHICAL MEMORY CACHE AWARENESS WITHIN A STORAGE SYSTEM

(71) Applicant: INTERNATIONAL BUSINESS MACHINES CORPORATION, Armonk, NY (US)

(72) Inventors: Binny S. Gill, Shrewsbury, MA (US); Haim Helman, Saratoga, CA (US); Edi Shmueli, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/923,844

(22) Filed: Oct. 27, 2015

(65) Prior Publication Data

US 2016/0048452 A1 Feb. 18, 2016

Related U.S. Application Data

(63) Continuation of application No. 13/112,601, filed on May 20, 2011, now Pat. No. 9,201,794.

(51) Int. Cl.
*G06F 12/0811* (2016.01)
*G06F 12/0862* (2016.01)

(52) U.S. Cl.
CPC ...... *G06F 12/0862* (2013.01); *G06F 12/0811* (2013.01); *G06F 2212/283* (2013.01);
(Continued)

(58) Field of Classification Search
CPC .......................... G06F 12/0862; G06F 12/0215
See application file for complete search history.

(56) References Cited

U.S. PATENT DOCUMENTS

| 1,685,321 A | 9/1928 | Groenke |
| 6,564,285 B1 | 5/2003 | Mills et al. |

(Continued)

FOREIGN PATENT DOCUMENTS

| CN | 101013427 A | 8/2007 |
| CN | 101595462 A | 12/2009 |
| KR | 20080037385 | 10/2009 |

OTHER PUBLICATIONS

Tae Ho Kgil, "Architecting Energy Efficient Servers" pp. 1-123, 2007.

(Continued)

*Primary Examiner* — Midys Rojas
*Assistant Examiner* — Khoa D Doan
(74) *Attorney, Agent, or Firm* — Griffiths & Seaton PLLC

(57) ABSTRACT

A computing device-implemented method for implementing dynamic hierarchical memory cache (HMC) awareness within a storage system is described. Specifically, when performing dynamic read operations within a storage system, a data module evaluates a data prefetch policy according to a strategy of determining if data exists in a hierarchical memory cache and thereafter amending the data prefetch policy, if warranted. The system then uses the data prefetch policy to perform a read operation from the storage device to minimize future data retrievals from the storage device. Further, in a distributed storage environment that include multiple storage nodes cooperating to satisfy data retrieval requests, dynamic hierarchical memory cache awareness can be implemented for every storage node without degrading the overall performance of the distributed storage environment.

18 Claims, 5 Drawing Sheets

(52) U.S. Cl.
CPC .......... *G06F 2212/604* (2013.01); *G06F 2212/6024* (2013.01); *G06F 2212/6046* (2013.01)

(56) References Cited

U.S. PATENT DOCUMENTS

| | | | |
|---|---|---|---|
| 6,574,707 B2 | 6/2003 | Shaw | |
| 7,272,710 B2 | 9/2007 | Radhakrishnan | |
| 7,472,256 B1 | 12/2008 | Nair et al. | |
| 7,562,192 B2 | 7/2009 | Henry et al. | |
| 7,565,494 B1 | 7/2009 | Todd et al. | |
| 7,877,546 B2* | 1/2011 | Zohar | G06F 12/0862 711/113 |
| 2006/0174228 A1* | 8/2006 | Radhakrishnan | G06F 9/30047 717/127 |
| 2008/0065718 A1 | 3/2008 | Todd et al. | |
| 2008/0320228 A1 | 12/2008 | Brunheroto et al. | |
| 2009/0055595 A1* | 2/2009 | Gill | G06F 12/0862 711/137 |
| 2009/0063777 A1 | 3/2009 | Usui | |
| 2009/0106498 A1 | 4/2009 | Lepak et al. | |
| 2009/0193187 A1 | 7/2009 | Barth, Jr. et al. | |
| 2010/0095070 A1* | 4/2010 | Okawara | G06F 12/0862 711/137 |
| 2010/0185816 A1 | 7/2010 | Sauber et al. | |
| 2010/0211731 A1 | 8/2010 | Mittendorff et al. | |
| 2010/0281221 A1 | 11/2010 | Cantin et al. | |
| 2012/0198148 A1* | 8/2012 | Benhase | G06F 12/0246 711/113 |

OTHER PUBLICATIONS

Kevin Lim et al., "Disaggregated Memory for Expansion and Sharing in Blade Servers" pp. 1-12, ISCA Jun. 20-24, 2009.
Seongcheol Hong et al., "NAND Flash-Based Disk Cache Using SLC/MLC Combined Flash Memory" pp. 21-30, 2010 INSPEC/IEEE Computer Society.
Verivue, Inc., "Optimizing Flash Memory for Content Delivery Platforms" pp. 1-6, 2008-2009.
Chang Joo Lee et al., "Prefetch-Aware DRAM Controllers" pp. 200-209, 41st IEEE/ACM International Symposium, Nov. 2008.
Wei-Fen Lin et al., "Reducing DRAM Latencies with an Intergrated Memory Hierarchy Design" pp. 301-312, HPCA 7th International Symposium, Jan. 2001.
Smith, "Sequential Program Prefetching Memory Hierarchies" pp. 1-19, IEEE Computer Society, Dec. 1978, No. 12, vol. 11.
Bekim Cilku et al., "Towards a Time-Predictable Hierarchical Memory Architecture—Prefetching Options to Be Explored" pp. 219-225, ISORCW 13th IEEE International Symposium, May 2010.

* cited by examiner

DYNAMIC HIERARCHICAL MEMORY CACHE AWARENESS WITHIN A STORAGE SYSTEM

CROSS REFERENCE TO RELATED APPLICATIONS

This Application is a Continuation of U.S. patent application Ser. No. 13/112,601, filed on May 20, 2011.

TECHNICAL FIELD

The invention relates to computing systems that perform data read operations according to a dynamic hierarchical memory cache awareness strategy.

BACKGROUND

Hierarchical memory systems include layers of memory such that one layer may be faster and smaller than another layer, which may be slower and larger. For example, Random Access Memory (RAM) is known to have register addressing to enable fast direct memory access for data retrieval. In contrast, hard disk drives (HDDs) are electromagnetic storage devices that require spinning platters to find the correct location on a platter to retrieve data. The seek time to find data stored on a hard disk drive is known to be much longer than the seek time of random access memory.

Accordingly, data retrieval that avoids performing seeks on the hard disk drive may improve overall storage system response time.

SUMMARY

Described are embodiments of an invention for dynamically developing a data prefetch strategy for a hierarchical memory cache storage system. For example, by examining at least one layer of a hierarchical memory cache storage system, the system develops an awareness of the data required for future read operations, thereby avoiding unnecessary data retrieval operations from a potentially slower storage device of the storage system by using an appropriate and selective data prefetch policy. This policy can be determined according to the data prefetch strategy.

In an exemplary embodiment, a computing device implemented method for data retrieval from a distributed storage environment comprises allocating data storage locations of a hierarchical memory cache module and a mass storage module. The method further includes determining a data prefetch policy by a data module. The data module further includes a method for determining if data exists in a first memory of the hierarchical memory cache module. In addition, the method includes determining if data exists in a second memory of the hierarchical memory cache module. Finally, the method includes selecting at least one data prefetch policy determined by the data module based on whether data exists in the second memory or the mass storage module if the data does not exist in the first memory.

It should be appreciated that other aspects of the invention will become apparent from the following detailed description taken in conjunction with the accompanying drawings, which illustrates by way of example, principles of the invention.

DETAILED DESCRIPTION

The following embodiments describe a method, system, and computer program product for implementing dynamic hierarchical memory cache awareness within a storage system. Specifically, when performing dynamic read operations within a storage system, a data module evaluates a data prefetch policy according to a strategy of determining if data exists in a hierarchical memory cache and thereafter amending the data prefetch policy, if warranted. The system then uses the data prefetch policy to perform a read operation from the storage device to minimize future data retrievals from the storage device. By dynamically changing the data prefetch policy as often as necessary, also known as selective prefetching, the system can learn how to predict future data access patterns. Further, in a distributed storage environment that include multiple storage nodes cooperating to satisfy data retrieval requests, dynamic hierarchical memory cache awareness can be implemented for every storage node without degrading the overall performance of the distributed storage environment. It will be obvious, however, to one skilled in the art, that embodiments of the present invention may be practiced without some or all of these specific details. In other instances, well known process operations have not been described in detail to prevent obscuring the embodiments of the present invention described herein.

Figure 1:
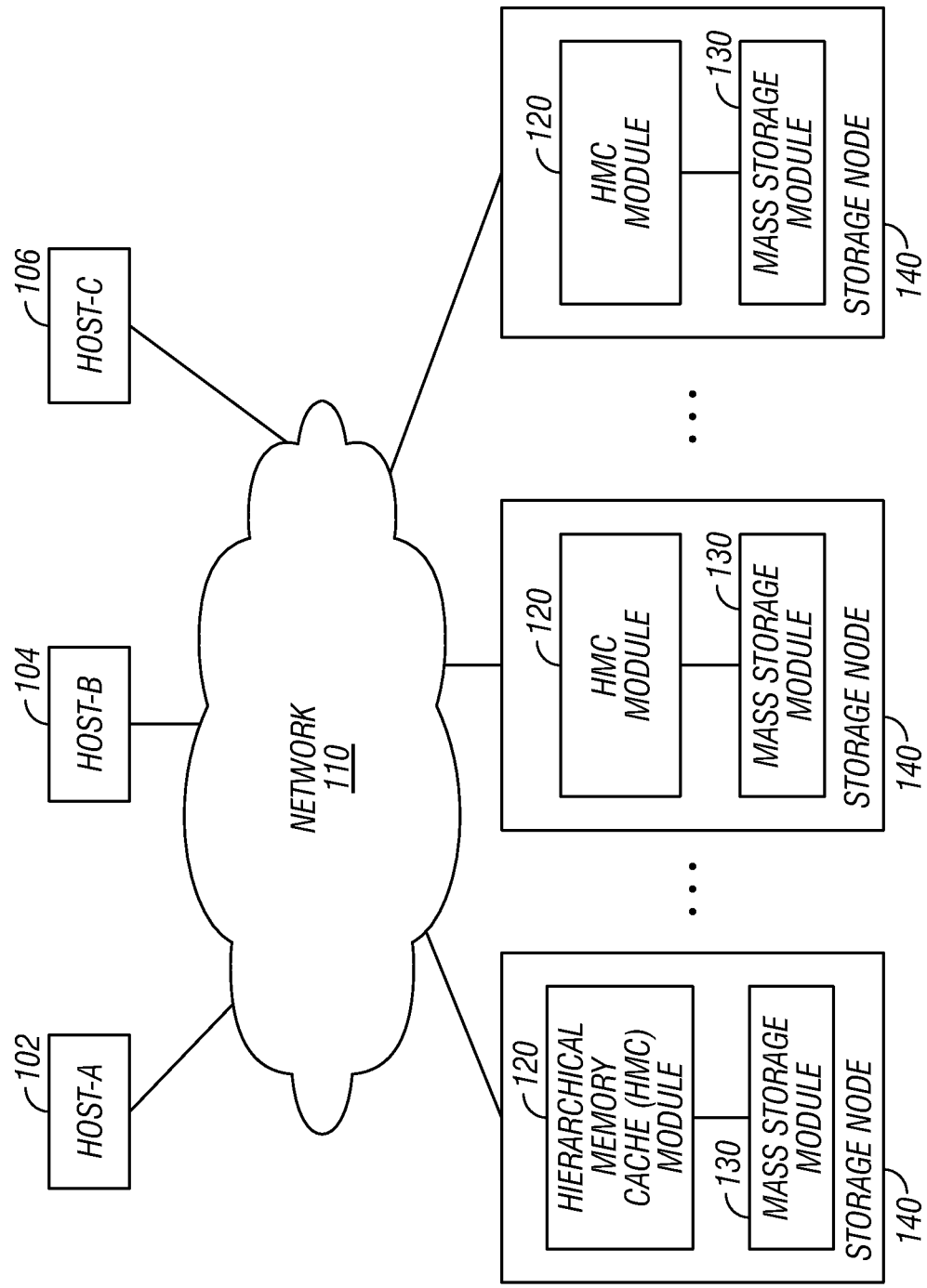
FIG. 1 is a diagram illustrating a distributed storage environment that performs data operations in accordance with an embodiment of the invention.

For example, FIG. 1 is a diagram illustrating a distributed storage environment that performs data operations, in accordance with an embodiment of the invention. Multiple host computers, such as Host-A 102, Host-B 104, and Host-C 106 communicate with at least one storage node 140 within a distributed storage environment. Each host computer can be server, client, laptop, tablet, console, switch, router, mobile device, such as a smartphone, or other computing device that provides data storage/retrieval/modification services to users of the distributed storage environment. Further, each storage node 140 is a computing device that includes at least one processor, random access memory, and the like. The internal components of the storage node 140 can be comprised of commercially available off-the-shelf components, or can be manufactured according to specifications. Regardless of how the storage node 140 is manufactured, it should be appreciated that it functions as a storage device for satisfying data operations, such as read and write operations. These read and write operations are generated to satisfy data requests to and from the host computers.

The storage node 140 receives, from one or more host computers, input/output (I/O) requests, which are commands to read or write data at logical addresses on logical volumes (not shown). Any number of host computers are coupled to the storage nodes 140 by any means known in the art, for example, using a network 110. Herein, only by way of example, the host computers and the storage nodes 140 are assumed to be coupled together to function as a Storage Area Network (SAN) incorporating data connections and Host Bus Adapters (HBAs) (not shown). Logical addresses specify a range of data blocks within a logical volume of the SAN, each block for example, sized as 512 bytes. In one embodiment, a 10 KB data record used in a data processing application on Host-A 102 may be stored as 20 blocks, which the host computer might specify as being stored at a logical address comprising blocks 1000 through 1019 of a logical volume. It should be appreciated that storage node 140 can also operate as a network attached storage (NAS), or hybrid SAN/NAS system.

Each storage node 140 includes a hierarchical memory cache (HMC) module 120 and a mass storage module 130. The HMC module 120 comprises at least one high speed memory device, such as dynamic random access memory, a solid state storage device, or the like. By using a high speed memory device, data can be stored and retrieved faster than other physical storage devices, such as hard disk drives (HDD)s, tape, or the like. It should be appreciated that the number of HMC modules 120 used in the storage node 140 may be any convenient number. While all HMC modules 120 in the storage node 140 may operate in substantially the same manner and comprise substantially similar elements, this is not a requirement in other embodiments. Each of the HMC modules 120 is coupled, and in communication with, a set of physical storage devices, such as mass storage module 130. Mass storage module 130 can include any type of storage media, such as hard disk drives (HDDs), tapes, optical drives, or the like. Those skilled in the art will be able to adapt the description herein of HMC modules 120 and mass storage modules 130 to different sizes, such as megabytes, gigabytes, terabytes, exabytes, or the like.

Each set of physical storage devices may comprise different slow and/or fast access times. For example, one physical storage device may be a high speed HDD while another physical storage device may be a lower speed HDD, thus perhaps having a lower cost than the higher speed HDD. In response to an I/O command, the HMC module 120 may read or write data at addressable physical locations of each physical storage device of the mass storage module 130. As will be later described with respect to the embodiment of FIG. 2B, the HMC module 120 may exercise certain control functions over the physical storage devices. These control functions, such as which HDD to access for a data seek operation, may alternatively be realized by hardware devices such as disk controllers (not shown), which can be linked to, or in communication with, the HMC module 120.

Data having contiguous logical addresses are generally distributed among the physical storage devices of the mass storage module 130. Alternatively, the data can be distributed using other algorithms, e.g., byte or block interleaving. In general, this increases bandwidth, for instance, by allowing a volume in a SAN or a file in network attached storage to be read from or written to more than one disk at a time. However, this technique requires coordination among the various HDDs, and in practice may require complex provisions for disk failure. Further, the technique may require a strategy for dealing with error checking information, e.g., a technique for storing parity information relating to distributed data. Indeed, when logical unit partitions are distributed in sufficiently small granularity, data associated with a single logical unit may span all of the physical storage devices.

Figure 2A:
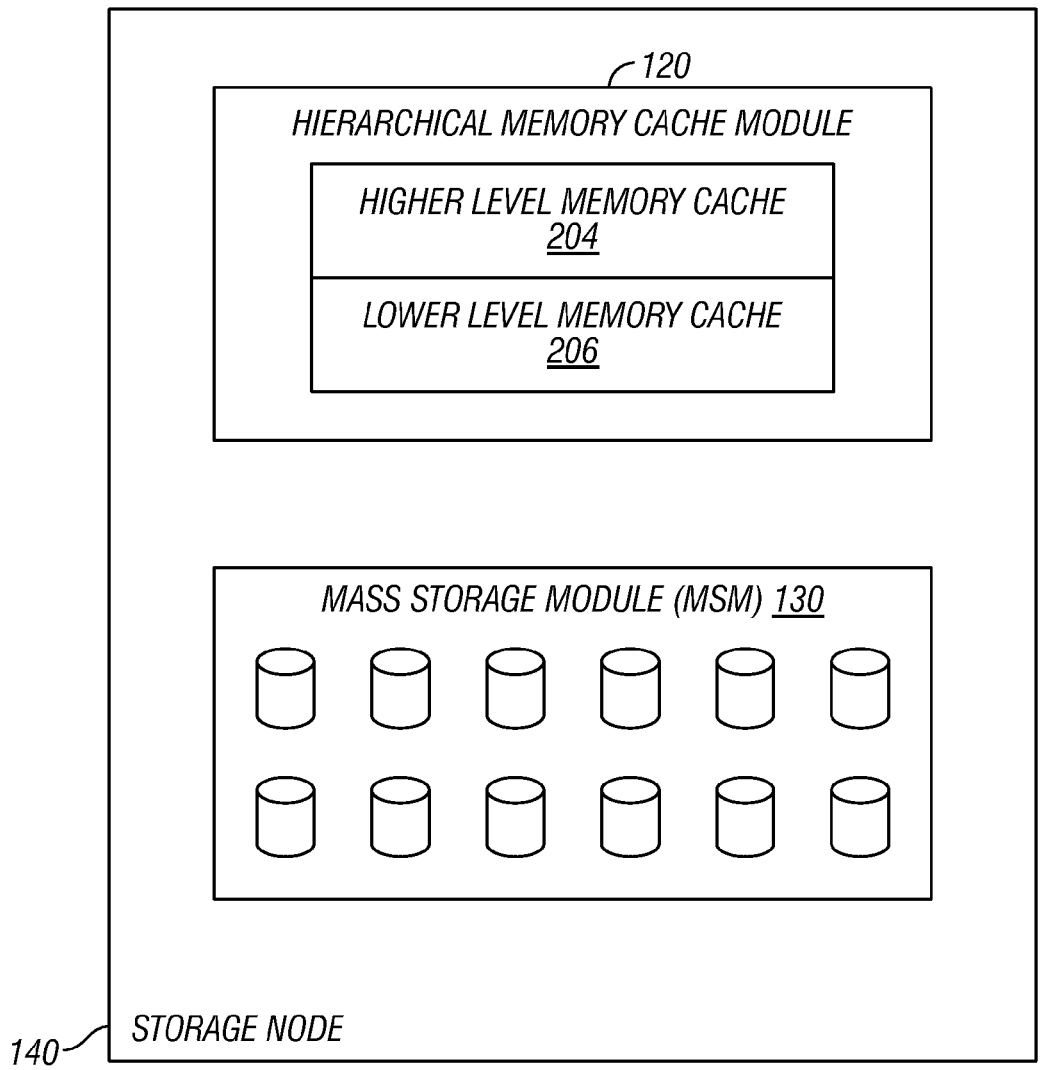
FIG. 2A is a diagram illustrating a storage node of the distributed storage environment, in accordance with an embodiment of the invention.

FIG. 2A is a diagram illustrating the storage node 140 of the distributed storage environment, in accordance with an embodiment of the invention. In one embodiment, the HMC module 120 can include a higher level memory cache 204 and a lower level memory cache 206. In alternative embodiments, there may be more or less levels of memory caches. Each of these memory caches can have faster access times for data retrieval than access times of the physical storage device of the mass storage module 130. For example, the higher level memory cache 204 can be volatile Dynamic Random Access Memory (DRAM) and the lower level memory cache 206 can be non-volatile Solid State Drive (SSD). It should be appreciated that these are only examples and that both memory caches can be non-volatile or volatile and can easily be interchanged to provide for example, a non-volatile higher level memory cache 204 and volatile lower level memory cache 206.

As described above, the mass storage module 130 includes a group of storage media, such as HDDs, tapes, and the like. It should be appreciated that the physical storage devices of the mass storage module 130 can also be SSDs, but for simplicity, HDDs will be described for the examples of the embodiments hereinafter described. Accordingly, by way of an example, the higher level memory cache 204 can have a faster data access time than the lower level memory cache 206. In turn, the lower level memory cache 206 has a faster data access time than the mass storage module 130. Other embodiments may have near simultaneous data access times among the levels of memory cache and mass storage module 130 but in those embodiments, the data bandwidth between the HMC module 120 and the mass storage module 130 may be limited and thus slower to respond to data access requests than a data access request to only the HMC module 120. Accordingly, it would be advantageous to be able to predict data access patterns so as to satisfy data read operations from higher speed storage devices without accessing slower speed storage devices.

Figure 2B:
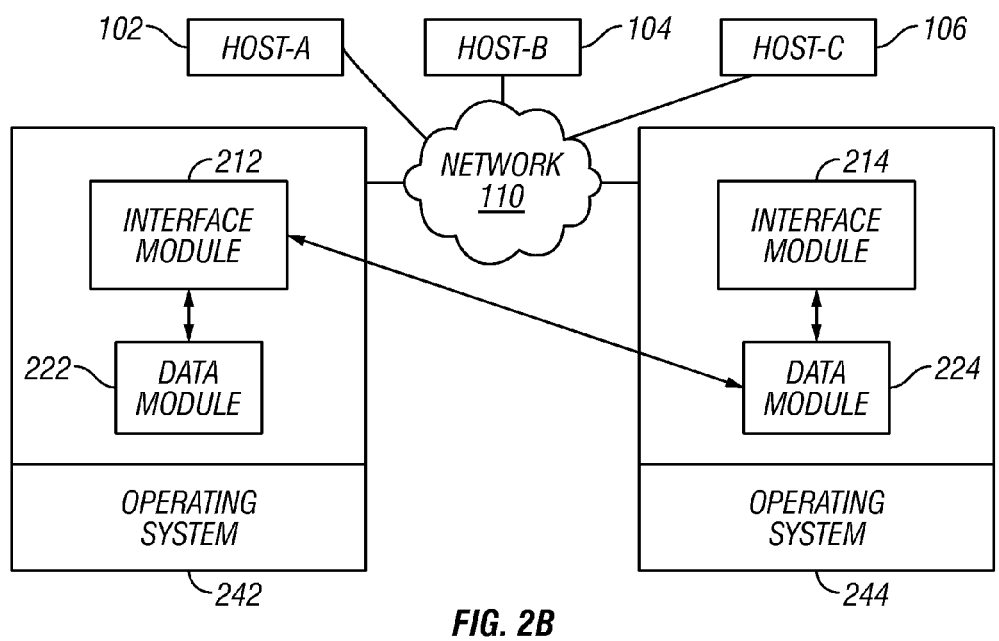
FIG. 2B is a diagram illustrating a pair of storage nodes of the distributed storage environment, in accordance with an embodiment of the invention.

Referring now to FIG. 2B, the figure illustrates a diagram of a pair of storage nodes of the distributed storage environment, in accordance with an embodiment of the invention. In the example with two storage nodes, a first storage node 242 performs as a distributed storage environment together with a second storage node 244. In particular, the host-A 102 can request data stored on the first storage node 242 by communicating over the network 110. Specifically, if the data to be accessed is stored on the mass storage module (not shown) of the first storage node 242, then the data access request is received by the interface module 212 and sent to the data module 222, which searches for the data locally. Alternatively, the if the data request originates from the host-C 106, the first storage node 242 may receive the request and communicate with the data module 224 of the second storage node 244 to satisfy the data request. Thus, in some embodiments, it should be appreciated that any interface module of any storage node can communicate with the data module of any other storage node to find data. Specifically, once any data module of any storage node receives the data seek operation request from an interface module, the data module communicates with the mass storage module of the storage node the data module resides to look for data.

Further, the first storage node 242 and the second storage node 244 each include an operating system. The operating system can be of any type, such as any Unix or Unix-like operating system or proprietary/non-proprietary operating systems. The function of each operating system of any storage node is to manage all the hardware and software resources of any storage node. It should be appreciated that some or all functions that enable the functionality of the interface module and data module can operate within the operating system. However, for purposes of the example shown by FIG. 2B, the interface module and data module operate outside of the operating system.

Figure 2C:
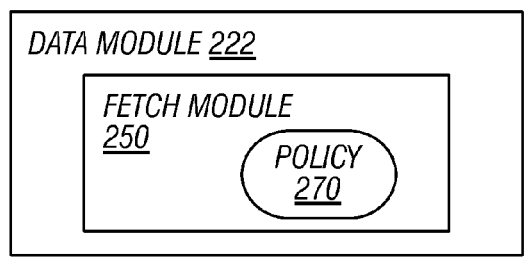
FIG. 2C is a diagram illustrating a data module of a storage node, in accordance with an embodiment of the invention.

In particular, FIG. 2C is a diagram illustrates a data module 222 of a storage node, in accordance with an embodiment of the invention. The data module 222 includes a fetch module 250 and at least one policy 270. The fetch module 250 determines whether or not to change a data prefetch policy, such the policy 270. Further, the fetch module 250 can perform these policy changes in accordance with a data prefetch strategy that can be determined by a user, system administrator, or the like. Specifically, an administrator may establish a policy such as: perform a data block read including the sought-after data along with 100KB of blocks around the data. Over time, by implementing embodiments of the invention, the policy can change to perhaps read more or less data around the sought-after data blocks. Alternatively, the policy 270 can be changed by the data module 222 by monitoring a history of how often data is retrieved from a particular volume. For example, the history may be kept in a log or database maintained by the data module 222 in memory. Specifically, in one embodiment, the log can be a bitmap of pages representing data blocks that have been accessed during a read operation. These pages can be the pages stored in the HMC and is a record of the data read operations that have been satisfied. Purely for example, the bitmap is at least the size of DRAM. It should be appreciated that a bitmap is only an example, and databases can be used for this purpose, such as flat or relational databases.

Figure 3:
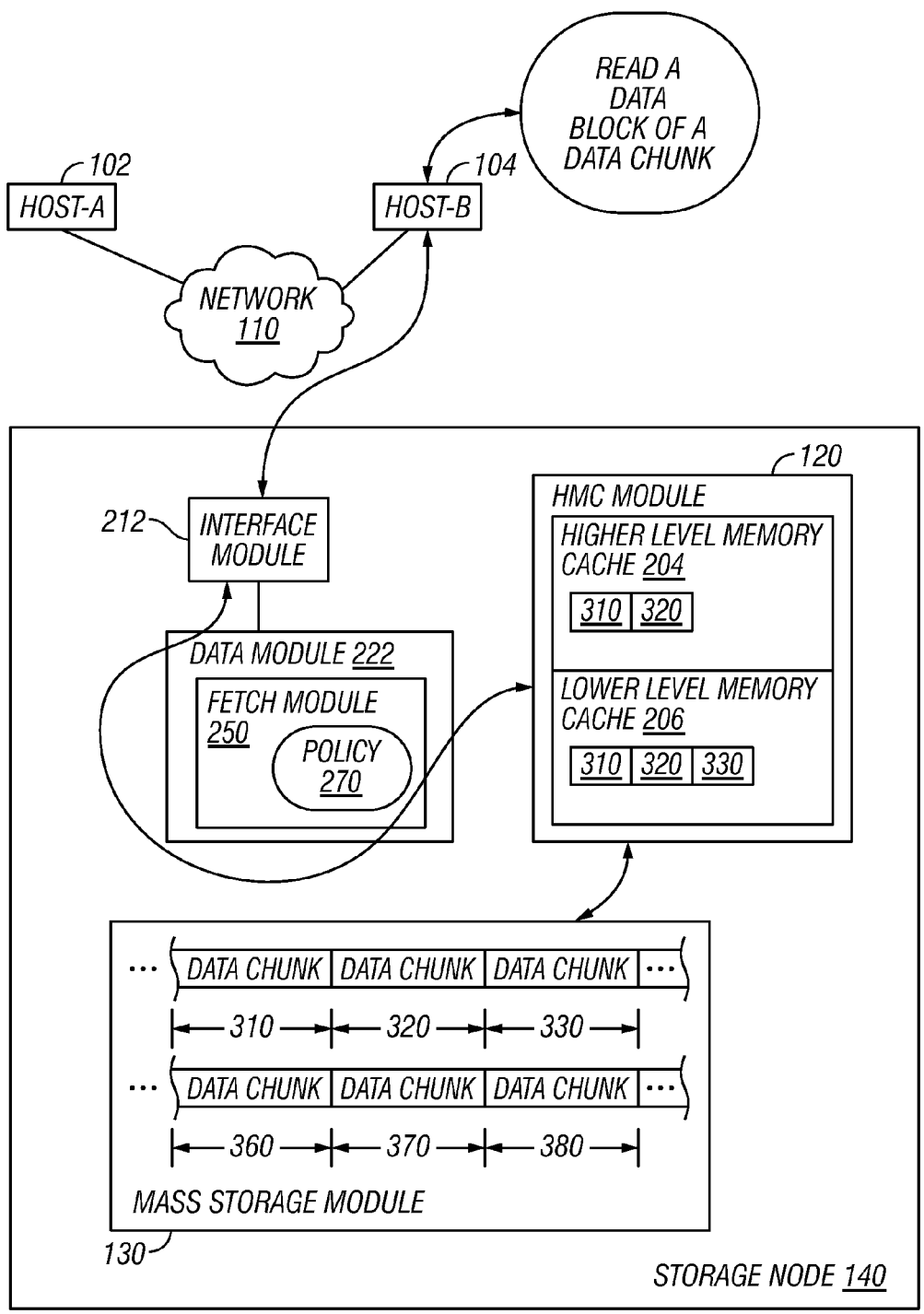
FIG. 3 is a diagram illustrating the operation of dynamic hierarchical cache awareness within a storage node, in accordance with an embodiment of the invention.

As a simple example, consider a data request such as one described with respect to FIG. 3 illustrating the operation of dynamic hierarchical cache awareness within a storage node, in accordance with an embodiment of the invention. The host-B 104 is operating a database (DB) application, such as for example, any well known relational database. The DB application does not have the data needed on host-B 104 and generates a data read operation. Ultimately, as will be discussed below, the data read operation will satisfy the request by performing a seek operation of a data block (data chunk) that has already been presumed to be stored by the storage system. Of course, if the data has not been stored by the storage system, a message of "data not found" may be returned to the host-B 104 instead of the data.

Next, the data read operation request is received by the interface module 212, which forwards the request to the data module 222. Now, the data module 222 checks the DRAM, which may be embodied in the HMC module 120 as the higher level memory cache 204. If the data chunk is not found in the higher level memory cache 204, then the data module 222 checks the lower level memory cache 206, which may be an SSD. If the data chunk is not found, then the data module 222 checks the mass storage module 130, which may include HDDs. By leveraging the notion of data locality, which may be defined as: if a chunk of data is requested, then the assumption is that an adjacent chunk of data can be requested in the near future. Accordingly, advantages of various embodiments of the invention perform data prefetching or data readahead. Specifically, when the data module 222 initiates the request to seek the data, and ultimately finds data chunks in the mass storage module 130, there is an assumption that adjacent data chunks may be accessed shortly. Thus, the data module 222 uses the fetch module 250 to implement a data prefetch policy 270 to read more data from the mass storage module 130 than what was originally requested. Advantageously, the data module 222 can avoid another seek in the future to a slower speed storage device.

For example with respect to the operation of a data prefetch policy in an embodiment of a distributed storage environment, data can be written to the mass storage module 130 in 1 MB data chunks. Logically, 1 MB of logical data on a volume can reside on 1 MB of physical storage on an HDD. Moreover, data chunks such as data chunk 310 to data chunk 380 can be written to the HDDs in a contiguous manner. Accordingly, if the data chunk 320 is sought by the DB application of the host-B 104, then the read performed can be data chunk 320 along with the surrounding data chunk 310 and data chunk 330. Thus, 3 MB of data chunks are stored by the lower level memory cache 206, which can have a faster seek time than the mass storage module 130. Thereafter, the data chunk 320 can be stored in the higher level memory cache 204 and returned to the data module 222. In turn, the data module 222 transmits data chunk 320 to the interface module 212 and to the host-B 104.

Later in time, the host-B 104 requests data chunk 310. During this read operation, the data module 222 finds the sought-after data chunk 310 in the lower level memory cache 206 after a fruitless search in the higher level memory cache 204. Thereafter, the data chunk 310 is stored in the higher level memory cache 204 and is transmitted to the host-B 104 in a similar fashion to data chunk 320. With respect to embodiments of the present invention, over time, the data chunks prefetched into the HMC module 120 may be more than is actually required to satisfy data read requests, or alternatively, may be inadequate and may need more than 1 MB data chunks surrounding a sought-after data chunk. Accordingly, the policy 270 can be changed to stop data prefetching, prefetch less data chunks, or prefetch more data chunks. Each data read operation provides an opportunity for the data module 222 to learn how much data chunks to prefetch and accordingly, can amend the policy 270 after every read operation.

It should be appreciated that although one policy 270 is shown in FIG. 3, there can be more than one policy. For example, a first policy can exist for the mass storage module 130 to lower level memory cache 206 data chunk transfer and a second policy can exist for the lower level memory cache 206 to higher level memory cache 204 data chunk transfer. In addition, data module 222 can store more than one policy, which can be used by the fetch module 250 to determine what prefetch policy to apply between any two layers of a memory hierarchy. For example, an embodiment may include two dynamic policies that can be selected for use when performing a read operation between the mass storage module 130 and the lower level memory cache 206. One policy can be used when the host-A 102 makes a data request and the other policy can be used when the host-B 104 makes a data request. In yet other embodiments, different applications or processes originating from a single host can trigger the use of a particular policy. Accordingly, the granularity and combination of prefetch policy to data request can change on-the-fly.

Further, since other embodiments may include any number of storage locations in a memory hierarchy, any number of policies can be managed to control the data prefetch activity between the memory hierarchy levels. These policies may be managed by the data module 222 and changed independent of one another.

Over time, data is evicted from levels of the HMC 120 because of the data has not be recently accessed, such as for example, Least Recently Used (LRU). Alternatively, a certain amount of specified time (perhaps by an administrator) may pass that a data chunk has not been accessed and is accordingly evicted to make room for new data chunks. For example, consider a scenario wherein data chunks have been evicted from the higher level memory cache 204, but continue to reside on the lower level memory cache 206. After the eviction, the data module 222 receives a data request and discovers the data is not in the higher level memory cache 204. The data module 222 then has to decide on a prefetch strategy. Specifically, the data module 222 has to decide how much data to prefetch from the lower storage layers for future data read requests. The sought-after data may or may not be found in the lower level memory cache 206. If the data is found in the lower level memory cache 206, then fetch the data chunk and return it to the requestor. Regardless, the data module 222 uses the data read operation to decide on a prefetch policy to implement for future data read operations.

For example, if the data chunk is fetched from the lower level memory cache 204 then the prefetch policy selected may be "don't do prefetching at all." If the data chunk is not in the lower level memory cache 204, then do a prefetch of 64K-512K from the mass storage module 130 (or lower layer that has higher seek time than the lower memory cache 204). Accordingly, by querying the HMC 120 to decide the prefetch policy, embodiments of the invention can improve overall data request times by dynamically learning how to prefetch data chunks dependent on the location of data in a memory hierarchy. These embodiments are dynamic because any prefetch policy may change on every read operation.

Figure 4:
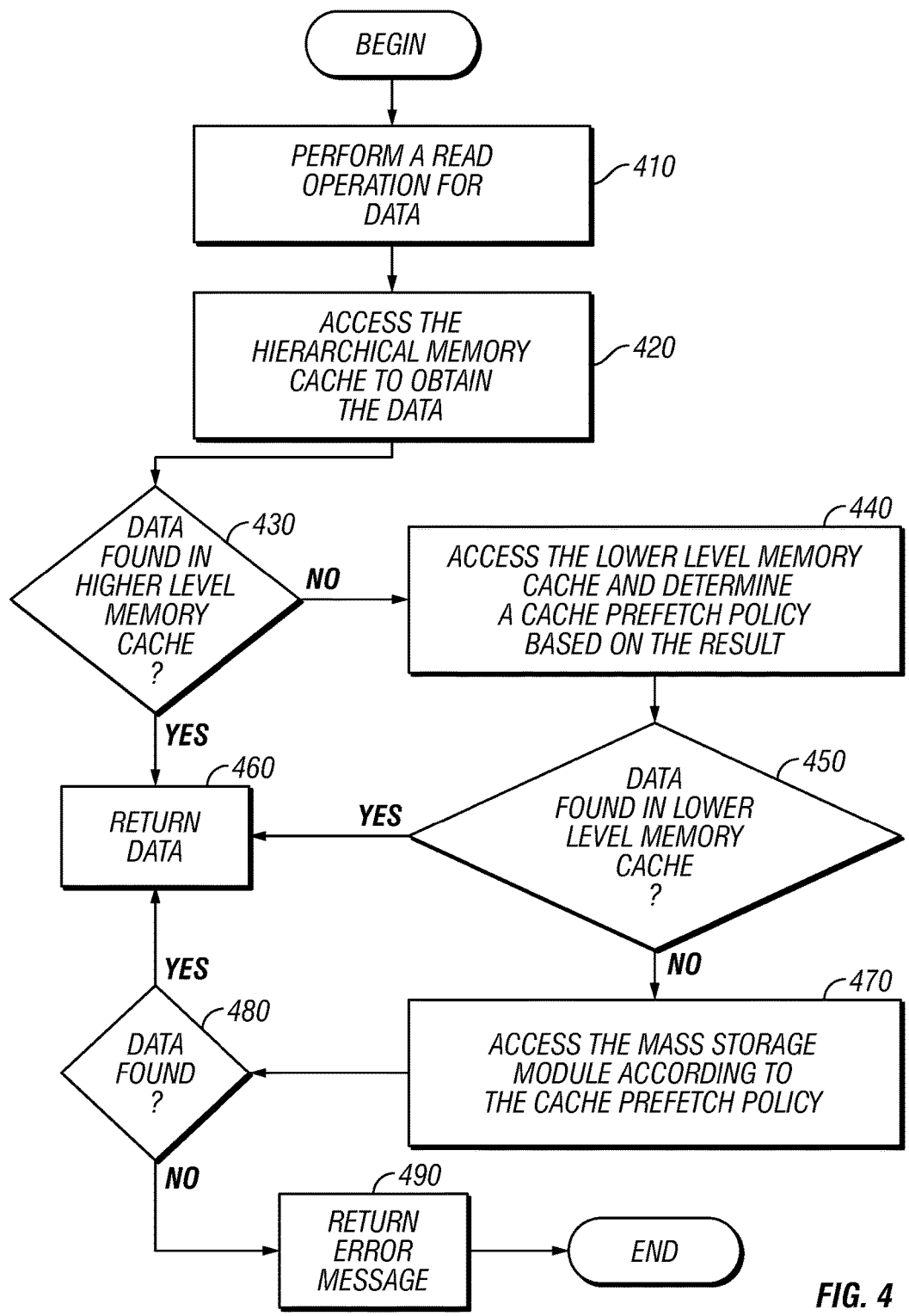
FIG. 4 is a flowchart of operations for executable code portions that enable dynamic hierarchical cache awareness within a distributed storage environment, in accordance with an embodiment of the invention.

FIG. 4 is a flowchart of operations for executable code portions that enable dynamic hierarchical cache awareness within a distributed storage environment, in accordance with an embodiment of the invention. Initially, a computing device can perform a read operation for data in operation 410. The read operation can be transmitted over a network, whether wired or wireless, or any combination thereof, to a storage node of the distributed storage environment. Upon receipt of the transmitted read operation, the storage node can access the hierarchical memory cache to obtain data in operation 420. Thereafter, in operation 430, the data module of the storage node determines if data is stored in the higher level memory cache. If the data is stored in the higher level memory cache, then in operation 460, return the data to the data module and ultimately to the computing device. However, if the data is not found, in operation 440 the data module accesses the lower level memory cache and determines a cache prefetch policy based on the result. Specifically, change the data prefetch policy in operation 450 if data is not found in the lower level memory cache. Then, access the mass storage module in operation 470 according to the cache prefetch policy. Even if the data is found in the lower level memory cache and returned in operation 460, the cache prefetch policy may be changed.

If the data is found in the mass storage device in operation 480, then return the data in operation 460. If the data is not found in the mass storage module in operation 480, then return an error message in operation 490. It should be appreciated that more than one prefetch policy can exist. For example, a policy can exist and be changed for every read operation performed on a level of memory. Accordingly, a first policy can exist and be dynamically modified for every read operation performed on a higher level memory cache. Moreover, a second policy can exist and be dynamically modified for every read operation on a lower level memory cache and a third policy can exist and be modified for the mass storage module. In yet other embodiments, the mass storage module may have a backing store of lower speed tape devices that may store data not found in the mass storage module. Accordingly, a fourth policy can exist that can be dynamically modified according to the methods described.

The foregoing description has been directed to particular embodiments of the invention. It will become apparent, however, that other variations and modifications may be made to the described embodiments, with the attainment of some or all of their advantages. For example, although the embodiments described herein include multiple computing systems of a distributed storage management system, one of ordinary skill in the art will realize that at least one computing device can perform all the operations described herein.

With the above embodiments in mind, it should be understood that the invention can employ various computer-implemented operations involving data stored in computer systems. These operations are those requiring physical manipulation of physical quantities. Usually, though not necessarily, these quantities take the form of electrical, magnetic, optical signals, or the like, that are capable of being stored, transferred, combined, compared, and otherwise manipulated. Any of the operations described herein that form part of the invention are useful machine operations. Additionally, the procedures, processes, and/or modules described herein may be implemented in hardware, software, embodied as a computer-readable medium having program instructions, firmware, or a combination thereof. Specifically, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Further, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a solid state (SSD) storage device, flash memory, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming or scripting languages including an object oriented programming language such as Java, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A computing device implemented method for data retrieval from a distributed storage environment, comprising:
   allocating data storage locations of a hierarchical memory cache module and a mass storage module;
   determining a data prefetch policy from among a plurality of data prefetch policies by a data module and selecting one of the plurality of data prefetch policies to perform a read operation to minimize future data retrieval operations;
   dynamically changing the data prefetch policy from among the plurality of data prefetch policies as needed according to the read operation during each of a plurality of data retrieval operations to predict future data access patterns and selecting more data than requested in the data prefetch policy, wherein each read operation dynamically learns an amount of data chunks to prefetch dependent on a location of the data in a hierarchy of memory;
   determining and selecting at least one of the plurality of data prefetch policies to perform a data retrieval operation by determining if data exists in the hierarchical memory cache module;
   determining if data exists in a first memory of the hierarchical memory cache module, wherein if the data is not located in the first memory of the hierarchical memory cache module:
      accessing a second memory of the hierarchical memory cache module using the at least one of the plurality of data prefetch policies;
   determining if data exists in the second memory of the hierarchical memory cache module; wherein if the data is not located in the lower level memory cache module:
      dynamically changing the at least one of the plurality of data prefetch policies if needed,
      accessing a mass storage module according to the cache prefetch policy, and
      selecting the at least one of the plurality of data prefetch policies determined by the data module based on whether data exists in the second memory or the mass storage module if the data does not exist in the first memory; wherein the plurality of data prefetch policies include each one of:
         a first policy that is dynamically modified as needed for each of a plurality of data retrieval operations on the first memory,
         a second policy that is dynamically modified as needed for each of the plurality of data retrieval operations on the second memory, and
         a third policy that is dynamically modified as needed for each of the plurality of data retrieval operations on the mass storage module; and
      changing the data prefetch policy during data retrieval.

2. The computing device implemented method of claim 1, further comprising avoiding a change to the data prefetch policy during data retrieval.

3. The computing device implemented method of claim 1, further comprising prefetching more data chunks surrounding retrieved data of the mass storage module.

4. The computing device implemented method of claim 1, further comprising prefetching less data chunks surrounding retrieved data of the mass storage module.

5. The computing device implemented method of claim 1, wherein at least one database records the data locations of data allocated in the hierarchical memory cache module.

6. A storage system, comprising:
a processor for determining a data prefetch policy from among a plurality of data prefetch policies by a data module and for dynamically changing the data prefetch policy from among the plurality of data prefetch policies as needed during each of a plurality of data retrieval operations to minimize future data retrieval operations and selecting more data than requested in the data prefetch policy; and
a memory, including,
a hierarchical memory cache for an allocation of data wherein the hierarchical memory cache further includes a first memory and a second memory that is larger than the first memory, wherein the first memory is a higher level memory cache module and the second memory is a lower level memory cache module; and
a mass storage module for the allocation of data wherein the data module:
determines and selects at least one of the plurality of data prefetch policies to perform a read operation to minimize future data retrieval operations during a data retrieval operation from the hierarchical memory cache and dynamically changing the at least one of the plurality of data prefetch policies as needed according to the read operation during the data retrieval operation to predict future data access patterns, wherein the read operation dynamically learns an amount of data chunks to prefetch dependent on a location of the data in storage system, and the processor device determines if the data is stored in a higher level memory cache module; wherein the plurality of data prefetch policies include each one of:
a first policy that is dynamically modified as needed for each of a plurality of data retrieval operations on the first memory,
a second policy that is dynamically modified as needed for each of the plurality of data retrieval operations on the second memory, and
a third policy that is dynamically modified as needed for each of the plurality of data retrieval operations on the mass storage module, wherein if the data is not located in the higher level memory cache module:
accessing a lower level memory cache module using the at least one of the plurality of data prefetch policies, and
determines if the data stored in the lower level memory cache module, wherein if the data is not located in the lower level memory cache module:
dynamically changing the at least one of the plurality of data prefetch policies if needed.

7. The storage system of claim 6, wherein data is not obtained from the hierarchical memory cache.

8. The storage system of claim 7, wherein the data prefetch policy prefetches more data chunks surrounding retrieved data of the mass storage module.

9. The storage system of claim 7, wherein the data prefetch policy prefetches less data chunks surrounding retrieved data of the mass storage module.

10. The storage system of claim 6, further comprising memory storing a database, wherein the database records data locations of data allocated in the hierarchical memory cache module.

11. A computer program product for performing dynamic read operations, the computer program product comprising a non-transitory computer-readable storage medium having computer-readable program code portions stored thereon, the computer-readable program code portions comprising:
an executable portion for determining a data prefetch policy from among a plurality of data prefetch policies and selecting one of the plurality of data prefetch policies to perform a read operation to minimize future data retrieval operations;
an executable portion for dynamically changing the data prefetch policy from among the plurality of data prefetch policies as needed according to the read operation during each of a plurality of data retrieval operations to predict future data access patterns and selecting more data than requested in the data prefetch policy, wherein each read operation dynamically learns an amount of data chunks to prefetch dependent on a location of the data in a hierarchy of memory;
an executable portion for determining and selecting at least one of the plurality of data prefetch policies to perform a read operation from a storage device by determining if data exists in a hierarchical memory cache module;
an executable portion for performing a read operation from the storage device by using the at least one of the plurality of data prefetch policies determined by a data module when data does not exist in the hierarchical memory cache module; wherein the plurality of data prefetch policies include each one of:
a first policy that is dynamically modified as needed for each of a plurality of data retrieval operations on the first memory,
a second policy that is dynamically modified as needed for each of the plurality of data retrieval operations on the second memory, and
a third policy that is dynamically modified as needed for each of the plurality of data retrieval operations on the mass storage module;
an executable portion for determining if data is stored in a higher level memory cache module, wherein if the data is not located in the higher level memory cache module:
accessing a lower level memory cache module using the at least one of the plurality of data prefetch policies, and
determining if the data is stored in the lower level memory cache module, wherein if the data is not located in the lower level memory cache module:
dynamically changing the at least one of the plurality of data prefetch policies if needed, and
accessing a mass storage module according to the at least one of the plurality of data prefetch policies and returning the data; and
an executable portion for changing the data prefetch policy during a dynamic read operation.

12. The computer program product of claim 11, further including an executable portion for avoiding a change to the data prefetch policy during a dynamic read operation.

13. The computer program product of claim 11, further including an executable portion for prefetching more data chunks surrounding retrieved data of the storage device.

14. The computer program product of claim 11, further including an executable portion for prefetching less data chunks surrounding retrieved data of the storage device.

15. The computer program product of claim 11, further including an executable portion for recording data locations of data allocated in the hierarchical memory cache module.

16. The computer program product of claim 11, further including an executable portion for examining multiple levels of a hierarchical memory cache module.

17. The computer program product of claim 16, wherein the hierarchical memory cache module further includes a first memory and a second memory.

18. The computer program product of claim 11, further including an executable portion for evicting data from the hierarchical memory cache module.

\* \* \* \* \*